[72] Inventor Richard H. Adlhoch
Bellwood, Ill.

[21] Appl. No. 48,998
[22] Filed June 23, 1970
[45] Patented Dec. 21, 1971
[73] Assignee Motorola, Inc.
Franklin Park, Ill.

[54] DIGITAL DECODER
23 Claims, 2 Drawing Figs.

[52] U.S. Cl. .......... 340/172.5
[51] Int. Cl. .......... H04b 15/00
[50] Field of Search .......... 340/172.5; 325/473

[56] References Cited

UNITED STATES PATENTS

| | | | |
|---|---|---|---|
| 3,286,240 | 11/1966 | Thompson et al. | 340/172.5 |
| 3,349,378 | 10/1967 | Crawford | 340/172.5 |
| 3,372,376 | 3/1968 | Helm | 340/172.5 |
| 3,466,614 | 9/1969 | Mikailoff | 340/172.5 |
| 3,504,348 | 3/1970 | Hallman | 340/172.5 |
| 3,509,541 | 4/1970 | Gordon | 340/172.5 |
| 3,533,073 | 10/1970 | Wirsing et al. | 340/172.5 |

*Primary Examiner*—Raulfe B. Zache
*Assistant Examiner*—R. F. Chapuran
*Attorney*—Mueller & Aichele ABSTRACT: A digital decoder for a receiver including a two-stage storage register, a detector circuit, a bit counter and a 12-stage sequential address register. Each stage of the sequential address register is coupled to the bit counter and selectively coupled to the detector circuit output according to the binary code signal sequence. The binary code signal sequence is serially coupled to the storage register where it is detected by the detector circuit to develop an output signal which is coupled to the sequential address register. Counting pulses representing each binary data bit are coupled from the bit counter to the sequential address register. A stage of the sequential address register will change from a first to a second state when signals are simultaneously coupled to that stage from the detector circuit output, the bit counter, and the prior stage of the sequential address register. Serial operation of the stages of the sequential address register will occur if the correct binary code signal sequence is received.

INVENTOR
RICHARD H. ADLHOCH
BY Mueller & Aichele
ATTYS.

INVENTOR
RICHARD H. ADLHOCH
BY Mueller & Aichele
ATTYS.

DIGITAL DECODER

BACKGROUND

Selective-calling communications systems have come into wide use in this country over the last few years. Although tone signal selective calling has been used adequately for a number of years, the increased volume requires a system with a substantially greater capacity than tone signalling can provide. With a digital decoder in a selective call receiver, this greater capacity can be achieved.

Each digital receiver will respond to a different binary code signal sequence. The number of units which may be individually contacted is determined by the number of digits in the binary code signal sequence. To be able to separately contact a large number of digital selective call receivers, a binary code signal sequence containing a large number of digits must be used.

In order to make digital selective call receivers feasible at a reasonable cost, each digital decoder must be manufactured identical to all others. Each decoder, however, must be capable of being interconnected to allow it to respond to any one of possible combinations in the signal sequence. To provide this feature, interconnection straps and pins must be provided allowing each decoder to be wired to respond to any one of the possible combinations.

If the digital decoder is to be manufactured as a part of paging receiver, size and complexity must be kept to a minimum. The number of interconnection terminals must therefore be kept to a minimum. The number of stages and circuits in the decoder necessary for a binary code signal sequence containing a large number of digits must also be minimized. This minimization of the number of stages and of interconnection terminals cannot be allowed to affect the operation of the pager, or its freedom from spurious or false operation.

Although the digital decoder described herein is particularly useful in paging receivers wherein size and complexity must be minimized, it should be understood that the system described is not limited to such applications.

SUMMARY

An object of this invention is to provide a digital decoder which has a high degree of safety from false or spurious operation.

Yet another object of this invention is to provide an improved digital decoder capable of operation in response to any one of the possible combinations in the binary code signal sequence, which has a minimum of interconnection terminals and circuitry necessary to provide this capability.

A still further object of this invention is to provide an improved digital decoder which is capable of recognizing and storing information representative of more than one binary data bit in a single stage.

In practicing this invention, a digital decoder is provided for decoding a predetermined binary code signal sequence. The binary code signal sequence is serially coupled from a receiver digital demodulator to a multistage storage register which stores a predetermined number of the binary code signals in the binary code signal sequence. A detector circuit, having an output for each possible combination of binary code signals in the storage register, is coupled to the storage register. The detector circuit is responsive to the binary code signal combination in the storage register to produce a signal at one of the detector circuit outputs. A sequential address register is provided having a plurality of stages. The output of each stage is serially connected to the following sequential address register stage. Each stage is also selectively connected to one of the outputs of the detector circuit in accordance with the predetermined binary code signal sequence.

A cyclical counter is coupled to the digital demodulator for counting the binary code signals in the binary code signal sequence. The counter produces counting signals in response to each binary code signal, which are coupled to the stages of the sequential address register.

The first stage of the sequential address register is responsive to a combination of signals including signals from the detector circuit output coupled thereto, and a first counting signal from the cyclical counter to change from a first to a second stage and develop a sequential address register signal. Each subsequent address register stage is responsive to the sequential address register signal from the preceding stage, a signal from the detector circuit output coupled thereto, and a first signal from the cyclical counter, to cause the sequential address register stage to change from a first to a second stage and develop a sequential address register signal. The cyclical counter further develops second counting signals which cause the stages of the sequential address register to revert to the first stage after the following stage of the sequential address register has developed a sequential address register signal. This allows only two serially connected sequential address register stages to be in a second state simultaneously. An output circuit is provided that develops an output signal when the stages of the sequential address register have changed from a first to a second state in a complete sequence.

Further security in decoder operation may be afforded by the addition of a synchronization signal at the beginning and end of the binary code signal sequence. A synchronization detector, coupled to the digital demodulator, develops a synchronization pulse in response to a synchronization signal, which can be used to provide an additionally required input to the first stage of the sequential address register. The synchronization pulse developed at the end of the binary code signal sequence can be used to provide an additional input signal necessary to operate the output circuit.

THE DRAWING

FIG. 1 is a block diagram of a digital decoder incorporating the features of this invention; and FIG. 2 shown waveforms for various parts of the digital decoder illustrated in FIG. 1.

DETAILED DESCRIPTION

Figure 1:
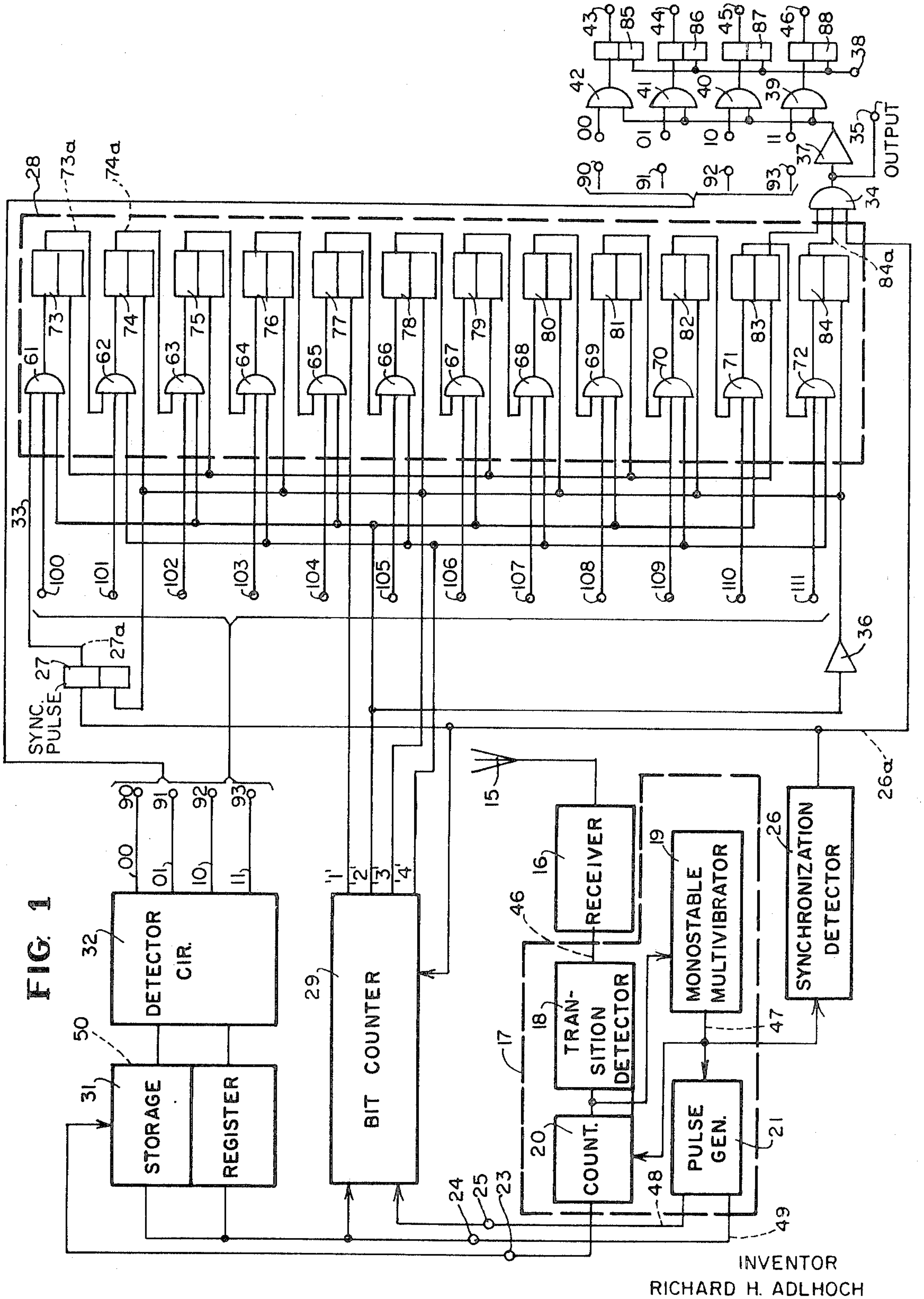

Referring now to FIG. 1, the digital decoder of this invention is shown with a radio receiver, for example of the paging type. Radiofrequency signals are received at antenna 15 and coupled to receiver 16, where they are processed in a manner well known in the art to become signals containing binary and timing information such as shown in FIG. 2, waveform 46.

Figure 2:
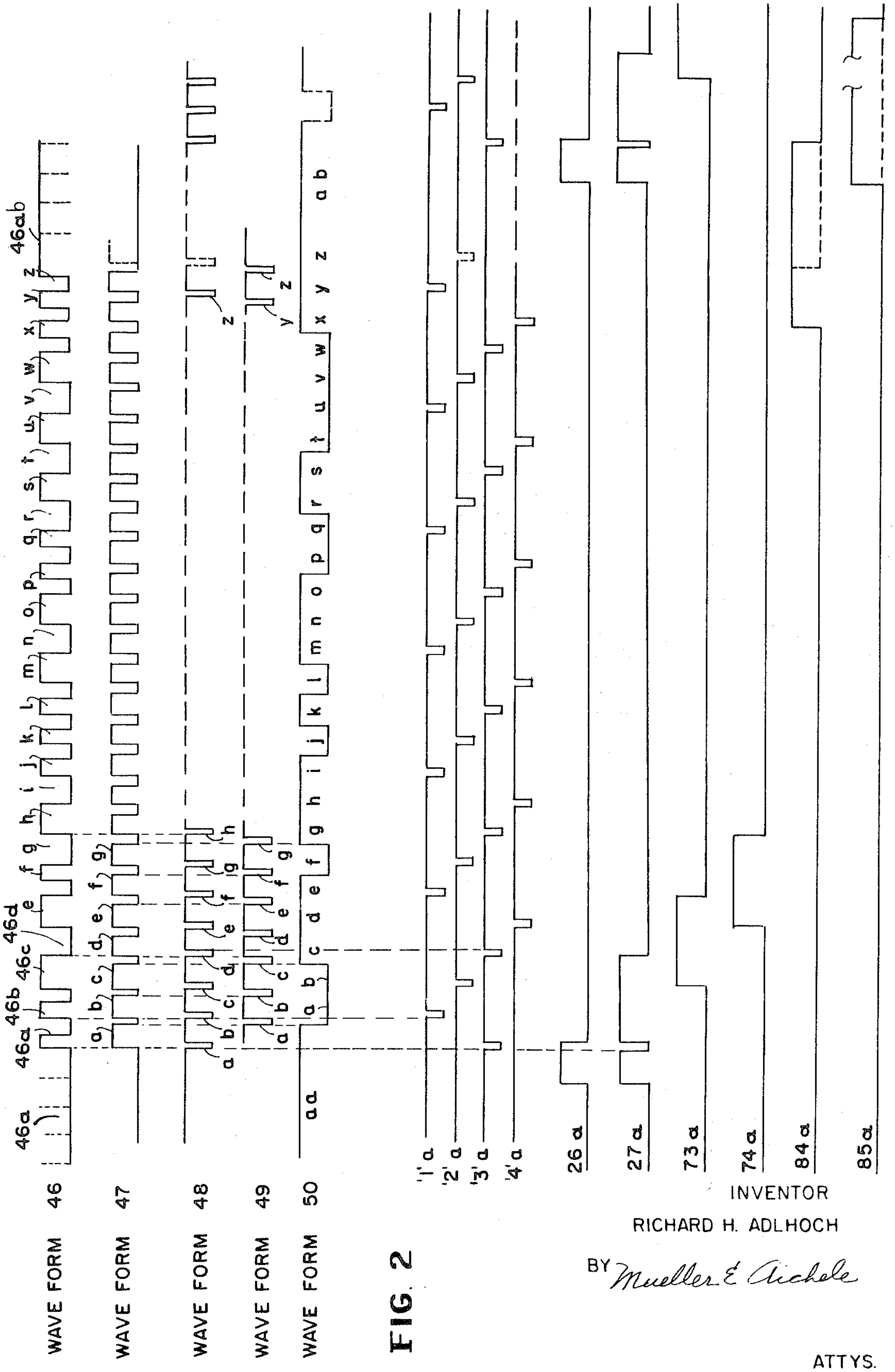

Referring to FIG. 2, waveform 46 includes a synchronization signal **46*aa* extending for four bit periods. Each bit period is denoted by the dashed lines in waveform 46*aa*. Following the synchronization signal is a 26-bit word, each bit being denoted by the alpha numeric 46*a* through 46*z*. Each bit in the 26-bit word contains both timing and binary information. The change in level at the beginning of each bit produces the timing information, and the presence or absence of a level change during a bit period produces the binary information. The level change during a bit occurs at approximately 50 percent of the bit period. Following the 26-bit work is another synchronization signal 46*ab***, again extending for four bit periods denoted by the dashed lines.

The signal shown by FIG. 2, waveform 46 is coupled from receiver 16 to digital demodulator 17. In digital demodulator 17, waveform 46 is coupled to transition detector 18 which produces a pulse in response to each level change, such as the level change between bit **46*c* and 46*d*. The pulses are coupled to monostable multivibrator 19 which will be energized by the pulse representing the level change at the beginning of each bit. The output of monostable multivibrator 19, is shown in FIG. 2 waveform waveform 47. Each time it is energized it develops a pulse having a period equal to approximately 75 percent of the bit period of a bit in waveform 46, as for example pulse 47*a*. When energized by the level shift at the beginning of bit 46*a*, it will remain energized during the time the pulses representing binary information are received. Deenergization of monostable multivibrator 19 will occur after the binary information pulses and prior to the next pulse produced by the level change at the beginning of the next bit. Monostable multivibrator 19** will therefore respond only to the pulse representing the beginning of the bit.

Pulses developed by monostable multivibrator 19 are coupled to counter 20 to energize the counter, and to pulse generator 21. Pulse generator 21 develops a first timing pulse in response to the deenergization of monostable multivibrator 19 shown in FIG. 2 waveform 49, and a second timing pulse, developed in a response to the energization of monostable multivibrator 19, shown in FIG. 2 waveform 48. That is, the level change at the beginning of each pulse shown in waveform 47 produces the second timing pulse shown in waveform 48, and the level change at the end of each pulse shown in waveform 47 produces the first timing pulse shown in waveform 49.

Counter 20 which is also coupled to transition detector 18, when energized by the pulses from monostable multivibrator 19, counts the pulses produced by transition detector 18 in response to level changes occurring during each bit, such as the level change shown in waveform 46 that occurs during bit 46*a*. No pulses or an even number of pulses counted during a bit indicates a binary one. A single pulse or an odd number of pulses counted during a bit indicates a binary zero.

First timing pulse, 49*a*, shown in FIG. 2 waveform 49, is coupled by conductor 24 from pulse generator 21 to storage register 31. Storage register 31 is also coupled to counter 20 by conductor 23. First timing pulse 49*a*, causes storage register 31 to sample counter 20 after counter 20 has counted the pulses representing binary information. The state of storage register 31 over a period of time then is represented by FIG. 2, waveform 50.

As can be seen by reference to FIG. 2, waveform 50 represents the binary information contained in waveform 46. Waveform 50 is delayed in time by three-quarters of a bit period from waveform 46. That is, the first pulse 49*a*, shown in waveform 49 causes the digital information represented by data bit 50*a* in waveform 50 to be stored in storage register 31. This occurs three-quarters of a bit period after the start of bit 46*a* in waveform 46. The second timing pulse 48*b* shown in waveform 48 FIG. 2, corresponding to the initiation of data bit 46*b* in waveform 46, will be used to gate certain sections of the digital decoder system as will be more clearly explained in the following operational explanation. We may say, for the purpose of explaining the operation of the digital decoder, waveform 50 represents the binary information received by storage register 31. Waveform 49 represents first timing pulses generated at the beginning of each binary data bit shown in waveform 50. Waveform 48 represents second timing pulses which occur after the first timing pulse represented by waveform 49 has been generated.

Waveform 50, in FIG. 2, consists of a synchronization signal 50*aa* extending for four bit periods, followed by a 26-bit binary code signal sequence of binary data bits denoted by the alpha numerics 50*a* through 50z. The first 24 bits of the 26-bit binary code signal sequence will address and activate the digital decoder system. The last two bits can be used to activate one of four additional circuits used to perform special functions. At the end of the code signal sequence, there is a synchronization signal 50*ab*, extending for four bit periods which indicates a complete binary code has been received, and allows activation of the output circuit.

The binary data bits in the binary code signal sequence as previously explained are serially coupled from demodulator 17 to storage register 31. Storage register 31 is a two stage storage register. A detector circuit 32 is coupled to storage register 31. Detector circuit 32 includes four AND gates for detecting the contents of storage register 31. The four outputs of detector circuit 32, shown in FIG. 1 as terminals 90 through 93, represent the four possible combinations of binary data bits present in storage register 31 at any particular period of time. Each stage of sequential address register 28 has one input thereto selectively connected to one of the four outputs of detector circuit 32 according to the binary code signal sequence to which this unit will respond. That is, one input to each stage of sequential address register 28, shown by terminals 100 through 111 is connected to one of the four output terminals 90, 91, 92, 93 of detector circuit 32. If the first two binary bits of the binary code signal sequence of this particular unit are 01, terminal 100 would be connected to terminal 91. If the second two binary bits are 11, terminal 101 would be connected to terminal 93.

Sequential address register 28 includes 12 serially connected stages. The minimum number of stages required is determined by the number of binary bits in the code signal sequence required to make the digital decoder respond, in this case 24 bits, divided by the number of stages in storage register 31. The number of bits in the code signal sequence is determined by the number of different code signal sequences required. If fewer code signal sequences are required, a shorter code signal sequence may be employed. A 22 bit code signal sequence would require one less stage in sequential address register 28. Each stage of sequential address register 28 is identical, and includes an AND gate and flip-flop, such as AND-gate 61 and flip-flop 73 in the first stage of sequential address register 28.

A two-stage storage register 31, and a 12-stage sequential address register 28 requires a minimum number of terminals. That is, a minimum number of connections between detector circuit 32 and sequential address register 28, to respond to a 24-bit binary code signal sequence. For example, with a 24-bit code signal sequence, a one-stage storage register, (two detector circuit outputs) and a 24-stage sequential address register, would require 26 terminals. A three-stage storage register (eight detector circuit outputs) and an eight-stage sequential address register, would require 16 terminals. A four-stage storage register (16 detector circuit outputs), and a six-stage sequential address register, would require 20 terminals. A two-stage storage register, and a 12-stage sequential address register requires 16 terminals. Although the two-stage storage register and 12-stage sequential address register require the same number of terminals as the three-stage storage register and eight-stage sequential address register, the former requires less circuitry.

Referring to the first stage of sequential address register 28, AND-gate 61 has three inputs. When signals are present at all inputs to AND-gate 61, it will develop a signal which is coupled to one input of flip-flop 73. Flip flop 73 will switch to a second state in response to the signal from AND-gate 61 and develop a first sequential address register signal represented by FIG. 2, waveform 73*a*. This signal is coupled to one input of the AND gate in the following stage. A second signal coupled to a second input of flip-flop 73 from cyclical bit counter 29 will cause flip-flop 73 to return to its first state.

Timing pulses shown by waveform 48 and 49 associated with each data bit are coupled by conductors 24 and 25 from pulse generator 21 in demodulator 17 to cyclical bit counter 29. Cyclical bit counter 29 is capable of counting to four. Bit counter 29 has an output for each possible count, labeled '1,' '2,' '3' and '4' in FIG. 1. The first timing pulse associated with each data bit, as for example timing pulse 49*a* in waveform 49, developed at the beginning of bit 50*a* in waveform 50, is coupled to bit counter 29 causing bit counter 29 to count. The second timing pulse associated with each data bit, as for example timing pulse 48*b* in waveform 48, developed at the beginning of bit 46*b* in waveform 46 (during bit 50*a* in waveform 50), allows the counting signal to be developed at the appropriate output.

The output of bit counter 29 representing a '1' count (FIG. 2, waveform '1'*a*) is coupled to the reset input of the flip-flop in each odd-numbered stage (e.g. AND-gate 61 and flip-flop 73), of sequential address register 28. The output of bit counter 29 representing a '2' count (FIG. 2, waveform '2'*a*) is coupled to one input of the AND gate in each odd-numbered state of sequential address register 28. The output of bit counter 29 representing a '3' count, (FIG. 2, waveform '3'*a*), is coupled to the reset input of the flip-flop in each even-numbered stage (e.g., AND-gate 62 and flip-flop 74), of sequential address register 28, and to flip-flop 27. The output of bit counter 29 representing a '4' count (FIG. 2, waveform '4'a) is coupled to one input of the AND gate in each even-numbered stage of sequential address register 28.

In operation the first synchronization signal 50aa in waveform 50 results from no level transitions occurring for four bit periods at the beginning of the binary code signal sequence. Monostable multivibrator 19 in digital demodulator 17 will not be energized during the four bit periods the synchronization signal is received. Synchronization detector 26, coupled to monostable multivibrator 19 will develop a synchronization pulse, (FIG. 2, waveform 26a) when monostable multivibrator 19 is not energized for more than three bit periods. The synchronization pulse is coupled to cyclical bit counter 29 causing it to develop a pulse on the '3' line, (waveform '3'a, FIG. 2) which resets even-numbered stages of sequential address register 28, and then initializes or resets counter 29, the synchronization pulse prevents counter 29 from counting pulse 48a, developed in response to data bit 46a. In addition, the synchronization pulse is also coupled to flip-flop 27 causing it to change from a first to a second state, and develop an output signal, (waveform 27a, FIG. 2), on line 33. This signal is coupled to one input of AND-gate 61, in the first stage of sequential address register 28. Flip-flop 27 provides one of the required inputs to AND-gate 61 in the first stage of sequential address register 28, just as flip-flop 73 provides one of the required inputs to AND-gate 62 in the second stage of sequential address register 28.

The first binary data bit 50a (waveform 50, FIG. 2), is coupled from counter 20 in demodulator 17 to storage register 31. At the same time a first timing pulse 49a (waveform 49, FIG. 2), is coupled from pulse generator 21 in demodulator 17 to storage register 31 and cyclical bit counter 29. First timing pulse 49a allows the first binary data bit 50a to be accepted and stored in the first stage of storage register 31. First timing pulse 49a will also cause cyclical bit counter 29 to register a '1' count. A second timing pulse 48b, associated with the first data bit (waveform 48, FIG. 2) will be generated, as previously stated. Timing pulse 48b is coupled from demodulator 17 to counter 29 allowing an output signal to appear on the '1' line (waveform '1'a, FIG. 2). The signal on the '1' line is coupled to the flip-flop in each odd-numbered stage of sequential address register 28, resetting to the first stage any which may have switched to the second state and aborting a possible false sequence of operation.

A second binary data bit 50b (waveform 50, FIG. 2), is now coupled from demodulator 17 to storage register 31. The first timing pulse associated with the secondary binary data bit, 49b, (waveform 49, FIG. 2), is coupled to storage register 31 allowing it to accept and store the second binary data bit, 50b in the first stage shifting the first data bit 50a, to the second stage. First timing pulse 49b will also cause cyclical bit counter 29 to register a '2' count.

Detector circuit 32 will sense the binary data bit combination of data bit 50a and 50bin the two stages of storage register 31 and generate a signal at the output terminal corresponding to that combination. That is, one of terminals 90 through 93 will be energized. With the energized terminal of detector circuit 32 connected to terminal 100, an input of AND-gate 61 in the first stage of sequential address register 28, signals will be present at two of the three inputs to AND-gate 61.

The second timing pulse associated with the second data bit 48c, when coupled to cyclical bit counter 29, allows a signal to appear on the '2' line (waveform '2'a, FIG. 2). The signal on the '2' line is coupled to the third input of AND-gate 61 in the first stage of sequential address register 28. When all three input signals are present, AND-gate 61 will develop a signal which is coupled to one input of flip-flop 73. Flip-flop 73 will switch to a second state in response to the signal from AND-gate 61 and develop a sequential address register signal represented by waveform 73a, FIG. 2. The sequential address register signal is coupled to one of the inputs to AND-gate 62 in the second stage of sequential address register 28. The first stage of sequential address register 28 has now effectively recognized and stored the first two binary address bits of the binary code signal sequence.

A third binary data bit 50c is now coupled from demodulator 17 to storage register 31. The corresponding first timing pulse 49c enters binary data bit 3 in the first stage of storage register 31, advances second data bit 50b to the second stage, and dumps first bit 50a. Cyclical bit counter 29 advances another count due to first timing pulse 49c, and an output is generated on the '3' line (waveform '3'a, FIG. 2), when the corresponding second timing pulse 48d is received. The signal on the '3' line is coupled to flip-flop 27 causing it to revert to a first state, as shown in FIG. 2 waveform 27a, ending the signal on the line 33.

The fourth binary data bit 50d is now coupled from demodulator 17 to storage register 31. A corresponding first timing pulse 49d allows binary data bit 4 to be entered into the first stage of storage register 31. Binary data bit 3, 50c, is advanced to the second stage, and binary data bit 2, 50b, is dumped. First timing pulse 49d will also cause cyclical bit counter 29 to register a '4' count.

Detector circuit 32 will sense the binary data bit combination of data bit 50c and 50d in the two stages of storage register 31, and generate a signal at the output terminal corresponding to that combination. If the energized terminal of detector circuit 32 is connected to terminal 101, an input of AND-gate 62 in the second stage of sequential address register 28, signals will be present at two of the three inputs to AND-gate 62.

The second timing pulse associated with the fourth binary data bit 48c, when coupled to cyclical bit counter 29, allows a signal to appear on the '4' line (waveform '4'a, FIG. 2). The signal on the '4' line is coupled to the third input of AND-gate 62 in the second stage of sequential address register 28. When all three input signals are present, AND-gate 62 will develop a signal which is coupled to one input of flip-flop 74. Flip-flop 74 will switch to a second state in response to the signal from AND-gate 61, and develop a sequential address register signal represented by waveform 74a, FIG. 2. The sequential address register signal is coupled to one input of AND-gate 63 in the third stage of sequential address register 28. The second stage of sequential address register 28 has now effectively recognized and stored the second two binary address bits in the binary code signal sequence.

A fifth binary data bit 50e, is now coupled from demodulator 17 to storage register 31. The corresponding first timing pulse 49e allows binary data bit 5 to be entered in the first stage of storage register 31, advances the fourth data bit, 50d, to the second stage and dumps the third binary data bit, 50c. Cyclical bit counter 29 recycles to a '1' count due to first timing pulse, 49e, and an output signal is developed on the '1' line (waveform '1'a, FIG. 2) when the corresponding second timing pulse 48f is received by bit counter 29. The signal developed on the '1' line is coupled to a second input of flip-flop 73 in the first stage of sequential address register 28 causing it to revert to the first state, thereby ending its sequential address register signal as shown in waveform 73a, FIG. 2.

The sixth binary data bit, 50f, is now coupled from demodulator 17 to storage register 31. A corresponding first timing pulse 49f, allows binary data bit 6 to be entered into the first stage of storage register 31. Binary data bit 5, 50e, is advanced to the second stage, and binary data bit 4, 50d, is dumped. First timing pulse 49f will also cause cyclical bit counter 29 to register a '2' count.

Detector circuit 32 will sense the binary data bit combination of data bits 50e and 50f in the two stages of storage register 31, and generate a signal at the output terminal corresponding to that combination. If the energized terminal of detector circuit 32 is connected to terminal 102, an input of AND-gate 63 in the third stage of sequential address register 28, signals will be present at two of the three inputs to AND-gate 63. The second timing pulse associated with the sixth binary data bit, 48*g*, when coupled to cyclical bit counter 29, allows a signal to appear on the '2' line (waveform '2'*a*, FIG. 2). The signal on the '2' line is coupled to the third input of the third stage of sequential address register 28. When all three input signals are present, AND-gate 63 will develop a signal which is coupled to one input of flip-flop 75. Flip-flop 75 will switch to a second state in response to the signal from AND-gate 63 and develop a sequential address register signal. The sequential address register signal is coupled to one input of AND-gate 64 in the fourth stage of sequential address register 28. The third stage of sequential address register 28 has now effectively recognized and stored the third pair of binary address bits in the binary code signal sequence.

A seventh binary data bit, 50*g*, is coupled from demodulator 17 to storage register 31. The corresponding first timing pulse, 49*g*, allows binary data bit 7, 50*g*, to be entered in the first stage of storage register 31, advances the sixth data bit, 50*f*, to the second stage, and dumps the fifth binary data bit, 50*e*. Cyclical bit counter 29 registers a '3' count due to first timing pulse 50*g*, and an output signal is generated on the '3' line (waveform '3'*a*, FIG. 2) when the corresponding second timing pulse, 48*h*, is received by bit counter 29. The signal developed on the '3' line is coupled to a second input of flip-flop 74 in the second stage of sequential address register 28, causing it to revert to the first stage, thereby ending its sequential address register signal as shown by waveform 74*a*, FIG. 2.

If the outputs of detector circuit 32 are coupled to the remaining stages of sequential address register 28 in accordance with the remainder of the binary code signal sequence, the stages will sequentially change from the first to second state and develop a sequential address register signal as the remainder of the binary code signal sequence is recognized. The two timing pulses associated with the binary data bit coupled to storage register 31, following the energization of a stage of sequential address register 28, are used to enter the data bit in storage register 31; and reset the stage of sequential address register 28 preceding the last stage changed to the second state. A '1' count output signal from bit counter 29 resets all odd-numbered stages of sequential address register 28. A '3' count output signal from bit counter 29 resets all even-numbered stages of sequential address register 28. Thus only two sequential stages of sequential address register 28 may be energized simultaneously, and then only for one bit period.

An alternate approach to the explanation of the decoder operation may here be stated to be the deactivation of a stage, for example the first stage of sequential register 28, before the actuation of a succeeding stage, as for example the third stage, thereby preventing more than two stages from being simultaneously activated.

When sequential address register 28 has sequenced through the 12 stages, flip-flop 84 in stage 12 will be energized (waveform 84*a*, FIG. 2). The output of flip-flop 84 may be used to activate a light, buzzer or the audio stage of a paging receiver. In the embodiment shown however, it is coupled to output AND-gate 34.

The first timing pulse, 49*y*, and the second timing pulse, 48*z*, generated when data bit 25, 50*y*, is coupled from demodulator 17 to storage register 31 will cause bit counter 29 to recycle to a '1', and develop an output signal on the '1' line. The signal developed on the '1' line is coupled to flip-flop 83, resetting flip-flop 83. A second sequential address register signal, generated when flip-flop 83 is in its reset state, is coupled from flip-flop 83 to one input of AND-gate 34. The energized output of flip-flop 84 is coupled to a second input of AND-gate 34.

Binary data bit 26, 50*z*, is now coupled from demodulator 17 to storage register 31. First timing pulse 49*z*, allows data bit 26. 50*z*, to be entered into the first stage of storage register 31 and shifts binary data bit 25, 50*y*, to the second stage. Detector circuit 32 will sense the binary data bit combination of bit 50*y* and 50*z* in storage register 31, and generate a signal at the output terminal corresponding to that combination. The second timing pulse associated with data bit 26, 50*z*, (dashed line in waveform 48, FIG. 2) is not generated if the appropriate synchronization signal follows data bit 50*z*. If this second timing pulse were generated, it would produce an output signal on the '2' line of bit counter 29. (dashed line in waveform '2'*a*, FIG. 2). The '2' signal would be coupled through inverter 36 to flip-flop 84 resetting flip-flop 84 as shown by the dashed portion of waveform 84*a*, FIG. 2. With flip-flop 84 reset, the second input necessary to activate AND-gate 34 would not be present, preventing activation of output 35.

Synchronization detector 26 will detect the synchronization signal following binary data bit 26, and develop a synchronization pulse shown by waveform 26*a*, FIG. 2. The synchronization pulse is coupled to the third input of output AND-gate 34. When the sequential address register signal from flip-flop 84, the second sequential address register signal from flip-flop 83, and the synchronization signal from synchronization detector 26 are all present, AND-gate 34 will develop an output signal at terminal 35, indicating that a complete binary code signal sequence has been received. The output signal coupled to terminal 35 may be used to activate a buzzer, light, or the audio section of a paging receiver.

The output signal from AND-gate 34 is also coupled through inverter 37 to one input of function AND-gates 39, 40, 41 and 42. Each of the four function AND gates has a second input, shown in FIG. 1 as terminals 90 through 93, coupled to one of the terminals of detector circuit 32. The output of each function AND gate is coupled to a function flip-flop, such as flip-flop 85. A signal will be developed at the terminal of detector circuit 32, corresponding to the contents of shift register 31 (data bits 25 and 26). The function AND gate to which this terminal is coupled, as for example AND-gate 42, will have input signals present at both inputs, causing it to develop a signal which will cause its associated flip-flop, flip-flop 85, to change to a second state, Flip-flop 85, will develop a function output signal at its output terminal, terminal 43, shown by waveform 85*a*, FIG. 2, which can be used to operate function devices such as lights or buzzers, in addition to the output provided at output 35.

If an incorrect binary code signal sequence has been transmitted, one stage of sequential address register 28 will not change to a second state at the appropriate time. The timing pulses associated with the following binary data bit will cause the flip-flop in the last energized stage of sequential address register 28 to reset. Without the sequential address register signal input from the previous stage, no further stages of sequential address register 28 can change to a second state. The decoder must wait until a new synchronization signal is received to energize flip-flop 27 and start a new cycle.

As can be seen, an improved digital decoder for a receiver has been provided which affords a high degree of safety from false or spurious operation. Each stage in the 12-stage sequential address register is capable of storing more than one binary data bit. A minimum of circuitry and interconnection terminals are required when a digital decoder is provided containing a two stage storage register and a 12-stage sequential address register.

What is claimed is:

1. A digital decoder operative in response to a particular composite signal comprising a series of binary bits, including in combination, circuit means responsive to a plurality of the binary bits in said composite signal to activate one of a plurality of first output circuits, a plurality of address register circuits each having an output and a plurality of register input circuits all to be energized for operation of an address register circuit, means connecting said address register circuits in series with the output of one coupled to one input of the following so that said address register circuits are sequentially operative, means coupling another input circuit of each address register circuit to an output circuit of said circuit means so that each address register circuit can be responsive only to the particular composite signal, further circuit means responsive to one signal bit for generating a deactivating signal, and responsive to a following signal bit for generating an activating signal, means coupling the deactivating signals to said address register circuits for deactivating a preceding register circuit before actuating a given register circuit, means coupling the actuating signal from said further circuit means to said input circuits of said address register circuits for actuating a single address register circuit in response to said following binary bit, and circuit means connected to a final address register circuit in the series thereof for responding to the last binary bit of the particular composite signal.

2. The digital decoder of claim 1 wherein said circuit means includes a plurality of storage register means for serially storing a plurality of the binary bits in said composite signal, and detector means coupled to said storage register means and operative in response to particular combinations of binary bits in said storage means to activate one of said plurality of first output circuits.

3. The digital decoder of claim 2 wherein said plurality of storage register means includes a two-stage storage register and said plurality of first output circuits includes four output circuits.

4. The digital decoder of claim 3 wherein said plurality of said address register circuits includes 12 storage register circuits.

5. The digital decoder of claim 4 wherein said series of bits has a first and each alternate bit thereafter considered odd bits and a second and each alternate bit thereafter considered even bits and wherein said further circuit means includes a counter circuit operative in response to each odd-numbered binary bit in said composite signal to generate said deactivating signal, and operative in response to each even-numbered bit in said composite signal to generate said activating signal.

6. The digital decoder of claim 5 wherein said counter circuit is a cyclical counter for cyclically counting to four.

7. A digital decoder operative in response to a particular composite signal comprising a series of binary bits including in combination, storage means for storing a plurality of binary bits in said composite signal, detecting means coupled to said storage means and having detector output circuits each activated by one of a particular combination of binary bits in said storage means, a plurality of address register circuits each having an output and a plurality of address register input circuits all to be energized for operation of an address register circuit, means connecting said address circuits in series with the output of one coupled to one input circuit of the following so that said address register circuits are sequentially operative, means coupling another input circuit of each address register circuit to an output circuit of said detecting means so that each address register circuit can be responsive only to one of a particular combination of signals in the storage means, a counter circuit responsive to each binary bit and responsive to a plurality of the binary bits to recycle after a predetermined number of binary bits, said counter circuit having a predetermined number of deactivating output circuits operated by a first binary bit, and having a predetermined number of actuating output circuits operated by a following binary bit, means connecting the actuating output circuits to the input circuits of the address register circuits for actuating a single address register circuit in response to said following binary bit, and circuit means connected to a final address register circuit in the series thereof for responding to the last binary bit of a particular composite signal.

8. The digital decoder of claim 7 wherein said storage means is a two-stage storage register for serially storing two of said binary bits in said composite signal.

9. The digital decoder of claim 8 wherein said predetermined number of deactivating output circuits is two, and said predetermined number of activating output circuits is two.

10. The digital decoder of claim 9 wherein a storage register circuit preceding the final address register circuit in said series includes second output circuit means coupled to said circuit means, said circuit means being responsive to the combination of said last binary bit of a particular composite signal and a deactivation of said address register circuit preceding said final address register circuit.

11. A system for detecting the corresponding of a predetermined binary code signal sequence including in combination, input means for serially receiving said binary code signal sequence, storage means coupled to said input means for storing a predetermined number of said binary code signals in said binary code signal sequence, detecting means coupled to said storage means and having a plurality of outputs each corresponding to a combination of binary code signals in said storage means, said detecting means being responsive to the binary code signal combination in said storage means to produce a signal at one of said detecting means outputs, cyclical counter means coupled to said input means for counting said binary code signals in said code signal sequence and producing first and second counting signals in response thereto, a plurality of sequential register means including a first sequential register means and a final sequential register means, serially connected one to another and sequentially operated, means coupling said first sequential register means to said cyclical counter means and to one of said detecting means outputs, said first sequential register means being responsive to a combination of said detector means output signal and said first counting signal to change from a first to a second state and develop a sequential register means signal, means coupling each succeeding sequential register means to said cyclical counter means and one of said detecting means outputs, each of said sequential register means being responsive to the sequential register means signal from the preceding sequential register means in said series, the detecting means output signal coupled thereto, and the first counting signal to cause such sequential register means to change from a first to a second state and develop its associated sequential register means signal, each of said sequential register means including circuit means responsive to said cyclical counter means second counting signal to cause such sequential register means to revert to said first state after the following sequential means in the series has developed a sequential register means signal, so that no more than two serially connected sequential register means may be in said second state simultaneously, and output means coupled to said final sequential register means in said series and responsive to a sequential register means signal therefrom to develop an output signal.

12. The system of claim 11 further including synchronization detection means coupled to said input means for detecting a predetermined number of identical binary code signals at the beginning of said binary code signal sequence and responsive thereto to develop a synchronization signal, said first sequential register means coupled to said synchronization detection means and responsive to a combination of signals including said synchronization signal, said detector means output signal and said first counting signal to change to said second state and develop its associated sequential register means signal.

13. The system of claim 11 further including synchronization detection means for detecting a predetermined number of said binary code signals at the end of said binary code signal sequence and responsive thereto to develop a synchronization signal, said output means being further coupled to said synchronization detection means and responsive to a combination of said synchronization signal and the change from said first to second state of said final sequential register means to develop an output signal.

14. The system of claim 11 further including function means having a plurality of function means outputs corresponding to said detecting means outputs, each of said function means coupled to one of said detecting means outputs and said output means, said function means responsive to a combination of said output means signal and a detecting means output signal coupled thereto to develop a function signal at one of said function means outputs.

15. The system of claim 11 wherein said storage means includes a storage register having a first and second stage.

16. The system of claim 15 wherein said detecting means includes a plurality of AND gate means each having a plurality of inputs coupled to said storage means, and a detecting means output, said AND gate means each being responsive to one of the combination of binary code signals in said storage means to produce a signal at one of said detecting means outputs.

17. The system of claim 16 wherein said plurality of AND gate means includes four AND gate means.

18. The system of claim 17 wherein said detecting means outputs includes interconnection terminals for selective connection of said detecting means outputs.

19. The system of claim 18 wherein said plurality of sequential register means includes 12 sequential register means.

20. The system of claim 19 wherein said sequential register means includes, first circuit means responsive to the combination of signals coupled to said sequential register means to develop a first circuit means signal, second circuit means coupled to said first circuit means and responsive to said first circuit means signal to change from a first to a second state and develop a sequential register means signal.

21. The sequential register means of claim 20 wherein said first circuit means is an AND gate and said second circuit means is a flip-flop.

22. The system of claim 21 wherein said first circuit means includes an input terminal for selective connection to one of said detection means output terminals.

23. A system for detecting the occurrence of a predetermined binary code signal sequence including in combination, input means for serially receiving said binary code signal sequence, storage means coupled to said input means and having a plurality of stages for storing a predetermined number of said binary code signals in said binary code signal sequence, detecting means coupled to said storage means and having a plurality of outputs each corresponding to a combination of binary code signals in said storage means, said detecting means responsive to the binary code signal combination in said storage means to produce a signal at one of said detecting means outputs, cyclical counter means for counting said binary code signals in said sequence, said counter being operative to count to a particular number equal to twice the number of stages in said storage means, said cyclical counter means developing a fourth output signal in response to said particular number, a third output signal in response to a count of said particular number minus one, a second output signal in response to a count of one-half said particular number, and a first output signal in response to a count of one-half said particular number minus one, a plurality of sequential register means, including a first sequential register means and a final sequential register means serially connected one to another and sequentially operated, means coupling said first sequential register means to said cyclical counter means and to one of said detecting means outputs, said first sequential register means operative in response to a combination of the detector means output signal coupled thereto and said counter second output signal to change from a first to a second state and develop a sequential register means signal, means coupling each succeeding sequential register means to said cyclical counter means and one of said detecting means outputs, an even-numbered sequential register means in said series being responsive to the sequential register means signal from the preceding sequential register means in said series, the detecting means output signal coupled thereto, and the counter means fourth output signal to cause such sequential register means to change from a first to a second state and develop its associated sequential register means signal, an odd-numbered sequential register means in said series being responsive to the sequential register means signal from the preceding sequential register means in said series, the detecting means output signal coupled thereto, and the counter means second output signal to cause such sequential register means to change from a first to a second state and develop its associated sequential register means signal, each of said even-numbered sequential register means including circuit means responsive to said counter means third output signal to terminate its associated sequential register means signal, each of said odd-numbered sequential register means including circuit means responsive to said counter means first output signal to terminate its associated sequential register means signal, and output means coupled to said final sequential register means in said series and responsive to a sequential register means signal therefrom to develop an output signal.

* * * * *